United States Patent
Chen et al.

(10) Patent No.: US 9,478,192 B2
(45) Date of Patent: Oct. 25, 2016

(54) IMAGE PROCESSING METHOD

(71) Applicant: SHENZHEN CHINA STAR OPTOELECTRONICS TECHNOLOGY CO., LTD., Shenzhen, Guangdong (CN)

(72) Inventors: Lixuan Chen, Guangdong (CN); Chih-tsung Kang, Guangdong (CN)

(*) Notice: Subject to any disclaimer, the term of this patent is extended or adjusted under 35 U.S.C. 154(b) by 0 days.

(21) Appl. No.: 14/370,232

(22) PCT Filed: Jan. 17, 2014

(86) PCT No.: PCT/CN2014/070830
§ 371 (c)(1),
(2) Date: Jul. 2, 2014

(87) PCT Pub. No.: WO2015/035744
PCT Pub. Date: Mar. 19, 2015

(65) Prior Publication Data
US 2016/0180807 A1    Jun. 23, 2016

(30) Foreign Application Priority Data
Sep. 12, 2013    (CN) .......................... 2013 1 0415067

(51) Int. Cl.
*G06T 5/00*    (2006.01)
*G06T 5/20*    (2006.01)
(Continued)

(52) U.S. Cl.
CPC ................. *G09G 5/02* (2013.01); *G06T 5/002* (2013.01); *G06T 5/20* (2013.01); *G06T 7/408* (2013.01);
(Continued)

(58) Field of Classification Search
None
See application file for complete search history.

(56) References Cited

U.S. PATENT DOCUMENTS

2009/0174725 A1* 7/2009 Kim .......................... G09G 5/02
                                                                345/590
2012/0008859 A1    1/2012 Schwartz
(Continued)

FOREIGN PATENT DOCUMENTS

CN    101149900 A    3/2008
CN    101188670 A    5/2008
(Continued)

OTHER PUBLICATIONS

Chung et al. "Removing chromatic aberration by digital image processing", Optical Engineer 49(6), 067002, Jun. 2010.*
(Continued)

*Primary Examiner* — Zhengxi Liu
*Assistant Examiner* — Yanna Wu

(57) ABSTRACT

The present invention discloses an image processing method includes steps of measuring stimulus value matrixes of trichromatic grays of a displaying image; calculating a stimulus value matrix of each pixel gray of the displaying image from the measured stimulus value matrixes; transforming the stimulus value matrixes of each pixel gray to coordinate values of each pixel in a color space; calculating a chromatic aberration between two adjacent pixels of each row and each column in the color space; selecting a pixel area and calculating a chromatic aberration value of the pixels in the selected pixel area and a chromatic aberration value between pixels of a periphery of the selected pixel area and the adjacent pixels out of the selected pixel area; executing an image process to the selected pixel area if a difference between these two chromatic aberration values and a preset chromatic aberration threshold value meets a predetermined rule.

10 Claims, 1 Drawing Sheet

(51) Int. Cl.
*G06T 7/40* (2006.01)
*G09G 5/02* (2006.01)

(52) U.S. Cl.
CPC ........... *G06T 2207/10024* (2013.01); *G06T 2207/20024* (2013.01); *G06T 2207/20032* (2013.01); *G09G 2320/029* (2013.01); *G09G 2320/0242* (2013.01)

(56) References Cited

U.S. PATENT DOCUMENTS

| | | | |
|---|---|---|---|
| 2013/0100312 A1 | 4/2013 | Nakazono et al. | |
| 2014/0119650 A1* | 5/2014 | Zhou .................... | H04N 1/6077 382/167 |

FOREIGN PATENT DOCUMENTS

| | | | |
|---|---|---|---|
| CN | 101256670 A | | 9/2008 |
| CN | 102685511 A | | 9/2012 |
| CN | 103514585 A | | 1/2014 |
| JP | 2002101422 A | | 4/2002 |
| JP | 2005072635 A | | 3/2005 |
| JP | 2009-055610 | * | 3/2009 |
| JP | 2009-268033 | * | 11/2009 |
| JP | 2011-205477 | * | 10/2011 |

OTHER PUBLICATIONS

Mallon et al. "Calibration and removel of lateral chromatic aberration in images", Pattern Recognition Letters 28 (2007) 125-135.*
Ferraro et al. "Full color 3-D imaging by digital holography and removal of chromatic aberrations", Journal of display technology, vol. 4, No. 1, Mar. 2008.*
Weiwei Sun, The International Searching Authority written comments, Jun. 2014, CN.
Haoxue Liu,The Application of CIE Uniform Color Space and Its Color Difference Formula, Sep. 2013, vol. 11, No. 3,Journal of Beijing institute of Graphic Communication,CN.

* cited by examiner

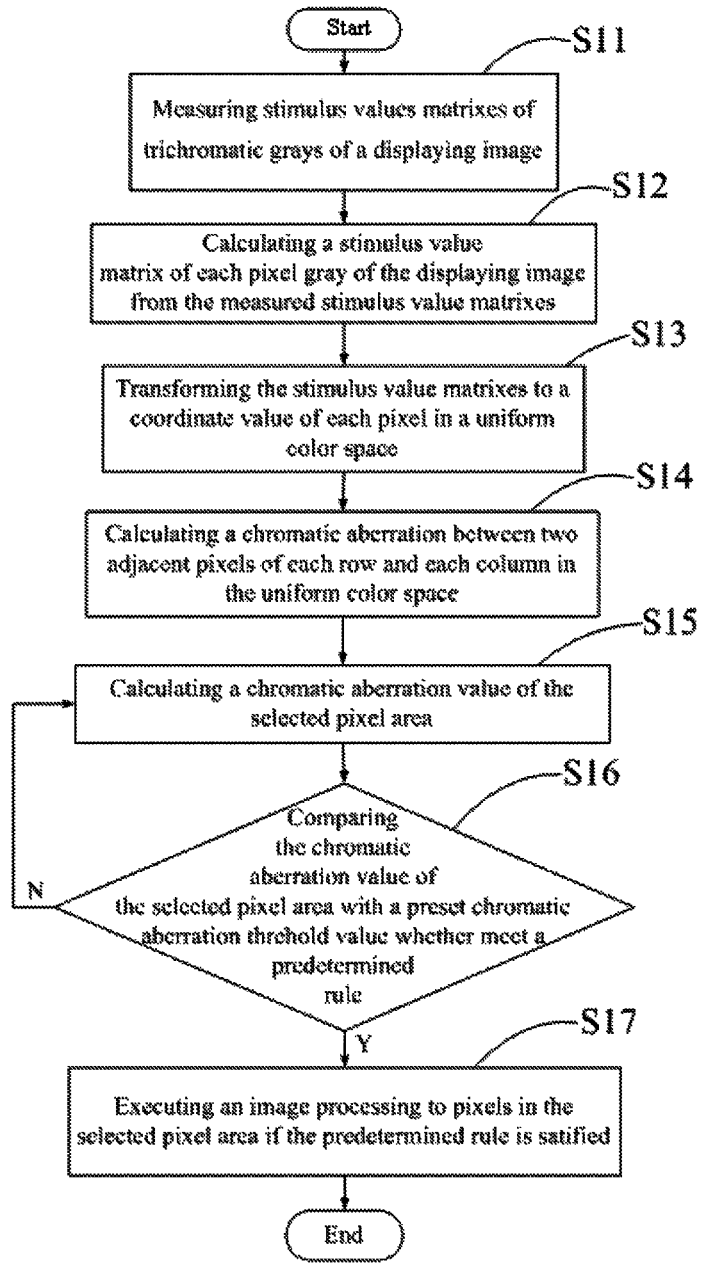

IMAGE PROCESSING METHOD

FIELD OF THE INVENTION

The invention relates to data processing technologies, and particularly, to an image processing method.

BACKGROUND OF THE INVENTION

An image processing method usually includes noise abatement and detail enhancement. That is, to reduce image noise deviating from the original chrominance caused by some external factors, such as hardware error, transmission interference, or heat influence, and to enhance useful details in an image. However, a current image processing method fails to exactly tell a difference between normal display details and image noise, thus eliminate some useful details during the noise abatement and decrease a smooth feeling of the image.

Therefore, an image processing method which can solve the above-mentioned problem needs to be provided.

SUMMARY OF THE INVENTION

To solve the above-mentioned problem, the present invention provides An image processing method including correspondingly measuring stimulus values matrixes of trichromatic grays of a displaying image; calculating a stimulus value matrix of each pixel gray of the displaying image from the measured stimulus value matrixes of trichromatic grays according to the color mixing theory; transforming the stimulus value matrixes of each pixel gray of the displaying image to a coordinate value of each pixel in a uniform color space; calculating a chromatic aberration between two adjacent pixels of each row and each column in the uniform color space; selecting a pixel area with a predetermined scale and calculating a chromatic aberration value of the pixels in the selected pixel area and a chromatic aberration value between pixels located along a periphery of the selected pixel area and the adjacent pixels out of the selected pixel area; comparing the chromatic aberration value of the pixels in the selected pixel area and the chromatic aberration value between pixels located along a periphery of the selected pixel area and the adjacent pixels out of the selected pixel area with a preset chromatic aberration threshold value; and executing an image process to the pixels in the selected pixel area if a difference between the chromatic aberration value of the pixels in the selected pixel area and the chromatic aberration value between pixels located along a periphery of the selected pixel area and the adjacent pixels out of the selected pixel area and the chromatic aberration threshold value meets a predetermined rule.

Wherein, the image process executed to the pixels of the selected pixel area comprises an image denoise process and an image enhancement process.

Wherein, the image denoise process is executed by a median filter.

Wherein, the image enhancement process employs the Laplace transformation.

Wherein, the uniform color space is selected from a group consisting of a CIE1960OUCS uniform color space, a CIE1964 W*U*V*uniform color space, a CIE1976L*u*v* uniform color space, and a CIE1976L*a*b* uniform color space.

Wherein, the uniform color space is a CIE1976L*a*b* uniform color space.

Wherein, the uniform color space is a CIE1976L*a*b* uniform color space.

Wherein, the selected pixel area is a 3×3 of pixel area.

Wherein, the chromatic aberration value of the pixels in the selected pixel area is a sum of the chromatic aberration values between each two adjacent pixels in the selected pixel area and the chromatic aberration value between pixels located along a periphery of the selected pixel area and the adjacent pixels out of the selected pixel area is a sum of the chromatic aberration values between each pixel located along the periphery of the selected pixel area and the corresponding adjacent pixel out of the selected pixel area.

Wherein, the predetermined rule is that if a difference between the sum of the chromatic aberration values of each two adjacent pixels in the selected pixel area and the sum of the chromatic aberration values between each pixel located along the periphery of the selected pixel area and the corresponding adjacent pixel out of the selected pixel area is greater than the chromatic aberration threshold value, the selected pixel area is considered as an area where the noise points stays and the image denoise process is executed in the selected pixel area.

Wherein, if the difference between the sum of the chromatic aberration values of each two adjacent pixels in the selected pixel area and the sum of the chromatic aberration values between each pixel located along the periphery of the selected pixel area and the corresponding adjacent pixel out of the selected pixel area and the chromatic aberration threshold value do not meet the predetermined rule, the other pixel area is selected to test.

The image processing method provided by the present disclosure analyzes the chromatic aberration in the selected pixel area to determine whether the selected pixel area needs to be processed or which kind of process needs to be executed in the selected pixel area. Thus, the image distortion due to a removal of the useful detail signal when the image is processed.

BRIEF DESCRIPTION OF THE DRAWINGS

In order to illustrate technical schemes of the present invention or the prior art more clearly, the following section briefly introduces drawings used to describe the embodiments and prior art. Obviously, the drawing in the following descriptions just is some embodiments of the present invention. The ordinary person in the related art can acquire the other drawings according to these drawings without offering creative effort.

FIG. 1 is a flow chart of steps of an image processing method in accordance with an embodiment of the present invention.

DETAILED DESCRIPTION OF THE PREFERRED EMBODIMENTS

The following sections offer a clear, complete description of the present invention in combination with the embodiments and accompanying drawings. Obviously, the embodiments described herein are only a part of, but not all of the embodiments of the present invention. In view of the embodiments described herein, any other embodiment obtained by the person skilled in the field without offering creative effort is included in a scope claimed by the present invention.

Referring to FIG. 1, an image processing method in accordance with an embodiment of the present invention includes the following steps:

Step S11, stimulus values matrixes of trichromatic grays of each pixel in a displaying image are correspondingly measured. A visualized color of each pixel of the displaying image is combined with sub-pixels of red, green, and blue having predetermined grays. Thus, for each pixel of the displaying pixel, a red gray stimulus matrix R(X, Y, Z), a green gray stimulus matrix G(X, Y, Z), and a blue stimulus matrix B(X, Y, Z) can be correspondingly measured according to a gamma curve of a display and components of the displaying signals.

Step S12, the stimulus value matrix of each pixel gray of the displaying image is calculated. According to the color mixing theory, the tristimulus values of the mixed color is a sum of stimulus values of each colors. Thus, the tristimulus values matrix S(X,Y,Z) of the displaying image grays is a sum of the red gray stimulus matrix R(X,Y,Z), the green gray stimulus matrix G(X,Y,Z), and blue gray stimulus matrix B(X,Y,Z). The summation formula as follow:

$$X=R(X)+G(X)+B(X)$$

$$Y=R(Y)+G(Y)+B(Y)$$

$$Z=R(Z)+G(Z)+B(Z)$$

Step S13, the tristimulus values matrix S(X, Y, Z) of each pixel gray of the displaying image is transformed as a coordinate value of each pixel in a uniform color space. Because a difference between the colors, named chromatic aberration, needs to be calculated, the uniform color space must be defined. Each point is the color space represents a kind of color. Thus, a distance between two points in the color space is proportional to a visual difference between two colors correspondingly represented by these two points in the color space. A same distance represents a same chromatic aberration. The common used uniform color spaces established by International Commission on Illumination includes a CIE1960OUCS uniform color space, a CIE1964 W*U*V*uniform color space, a CIE1976L*u*v* uniform color space, and a CIE1976L*a*b* uniform color space.

In this embodiment, the CIE1976L*a*b* uniform color space is employed. The CIE1976L*a*b*uniform color space uses a three-dimension coordinate system with L* for lightness and a* and b* for chromatic indexes to present the color. The transformation relationship between the L*, a* and b* and the tristimulus values matrix S(X, Y, Z) as follow:

$$L^*=116(Y/Y_n)^{1/3}-16$$

$$a^*=500[(X/X_n)^{1/3}-(Y/Y_n)^{1/3}]$$

$$b^*=200[(Y/Y_n)^{1/3}-(Z/Z_n)^{1/3}]$$

According to the transformation relationship, the coordinate values L*, a* and b* of each pixel color of the displaying image are calculated from the tristimulus values matrix S(X, Y, Z) of each pixel gray of the displaying image.

Step S14, the chromatic aberration between two adjacent pixels of each row and each column in the uniform color space is calculated. According to the coordinate values of each pixel color of displaying image in the uniform color space, the chromatic aberration between two adjacent pixels of each row and each column of the displaying image is calculated by a formula:

$$\Delta E^*_{ab}=\sqrt{(L^*_1-L^*_2)^2+(a^*_1-a^*_2)^2+(b^*_1-b^*_2)^2}=\sqrt{(\Delta L^*)^2+(\Delta a^*)^2+(\Delta b^*)^2}$$

because a same chromatic aberration value represent a same visual color difference, image noise points can be distinguished from normal points of the displaying image more easy and more objectively by analyzing the chromatic aberration value $\Delta E^*_{ab}$ of each pixel of the displaying image in the uniform color space.

Step S15, the chromatic aberration values of a pixel area with predetermined scale are calculated. The pixel area with predetermined scale is selected. A sum of the chromatic aberration values $\Delta E^*_1$ between each two adjacent pixels in the selected pixel area and a sum of the chromatic aberration value $\Delta E^*_2$ between pixels at a periphery of the pixel area and the adjacent pixels out of the selected pixel area are calculated. In this embodiment, the selected pixel area is a 3×3 of pixel area.

Step S16, a chromatic aberration threshold value $\Delta E^*_{th}$ is preset. A difference between the sum of the chromatic aberration values $\Delta E^*_1$ in the selected pixel area and the sum of the chromatic aberration value $\Delta E^*_2$ at the periphery of the selected pixel area is compared with the chromatic aberration threshold value $\Delta E^*_{th}$ to determine whether a relationship between the difference and the chromatic aberration threshold value $\Delta E^*_{th}$ meets a predetermined rule.

Step S17, if the difference between the sum of the chromatic aberration values $\Delta E^*_1$ in the selected pixel area and the sum of the chromatic aberration value $\Delta E^*_2$ at the periphery of the selected pixel area and the chromatic aberration threshold value $\Delta E^*_{th}$ meets the predetermined rule, the pixels in the selected pixel area are processed. The image process includes an image denoise process and an image enhancement process. The image denoise process can be executed by a median filter. The image enhancement process can employ the Laplace transformation.

In this embodiment, if the difference between the sum of the chromatic aberration values $\Delta E^*_1$ in the selected pixel area and the sum of the chromatic aberration value $\Delta E^*_2$ at the periphery of the selected pixel area is greater than the chromatic aberration threshold value $\Delta E^*_{th}$, the selected pixel area is considered as an area where the noise points stays and the image denoise process is executed in the selected pixel area.

If the difference between the sum of the chromatic aberration values $\Delta E^*_1$ in the selected pixel area and the sum of the chromatic aberration value $\Delta E^*_2$ at the periphery of the selected pixel area and the chromatic aberration threshold value $\Delta E^*_{th}$ cannot meet the predetermined rule, the other pixel area is selected to test.

The image processing method provided by the present disclosure analyzes the chromatic aberration in the selected pixel area to determine whether the selected pixel area needs to be processed or which kind of process needs to be executed in the selected pixel area. Thus, the image distortion due to a removal of the useful detail signal when the image is processed.

What is said above are only preferred examples of present invention, not intended to limit the present invention, any modifications, equivalent substitutions and improvements etc. made within the spirit and principle of the present invention, should be included in the protection range of the present invention.

What is claimed is:

1. An image processing method, comprising:
correspondingly measuring stimulus values matrixes R(X,Y,Z), G(X,Y,Z) and B(X,Y,Z) of trichromatic grays of a displaying image;
calculating a stimulus value matrix S(X,Y,Z) of each pixel gray of the displaying image by summing the measured stimulus value matrixes R(X,Y,Z), G(X,Y,Z) and B(X,Y,Z) of trichromatic grays according to formulas:

$$X=R(X)+G(X)+B(X),$$

$$Y=R(Y)+G(Y)+B(Y),$$

$$Z=R(Z)+G(Z)+B(Z);$$

transforming the stimulus value matrixes of each pixel gray of the displaying image to a coordinate value of each pixel in a uniform color space by formulas:

$$L^*=116(Y/Y_n)^{1/3}-16$$

$$a^*=500[(X/X_n)^{1/3}-(Y/Y_n)^{1/3}]$$

$$b^*=200[(Y/Y_n)^{1/3}-(Z/Z_n)^{1/3}],$$

wherein $L^*$ represents for lightness, $a^*$ and $b^*$ represents for chromatic indexes, wherein Xn, Yn and Zn are XYZ tristimulus values of a reference white point;

calculating a chromatic aberration between two adjacent pixels of each row and each column in the uniform color space by a formula:

$$\Delta E^*_{ab}=\sqrt{(L^*_1-L^*_2)^2+(a^*_1-a^*_2)^2+(b^*_1-b^*_2)^2}=\sqrt{(\Delta L^*)^2+(\Delta a^*)^2+(\Delta b^*)^2};$$

selecting a pixel area with a predetermined scale and calculating a chromatic aberration value of the pixels in the selected pixel area and a chromatic aberration value between pixels located along a periphery of the selected pixel area and the pixels' adjacent pixels on the periphery of the selected pixel area;

comparing the chromatic aberration value of the pixels in the selected pixel area and the chromatic aberration value between pixels located along a periphery of the selected pixel area and the pixels' adjacent pixels on the periphery of the selected pixel area with a preset chromatic aberration threshold value; and considering the selected pixel area as an area where noise points stay and executing an image denoise process to the pixels in the selected pixel area if a difference between the chromatic aberration value of the pixels in the selected pixel area and the chromatic aberration value between pixels located along a periphery of the selected pixel area and the pixels' adjacent pixels on the periphery of the selected pixel area and the chromatic aberration threshold value meets a predetermined rule, wherein the predetermined rule is that the difference is greater than the chromatic threshold aberration value.

2. The image processing method of claim 1, wherein the image process executed to the pixels of the selected pixel area comprises an image demise process and an image enhancement process.

3. The image processing method of claim 2, wherein the image denoise process is executed by a median filter.

4. The image processing method of claim 2, wherein the image enhancement process employs the Laplace transformation.

5. The image processing method of claim 1, wherein the uniform color space is selected from a group consisting of a CIE1960OUCS uniform color space, a CIE1964W*U*V* uniform color space, a CIE1976L*u*v* uniform color space, and a CIE1976L*a*b* uniform color space.

6. The image processing method of claim 1, wherein the uniform color space is a CIE1976L*a*b* uniform color space.

7. The image processing method of claim 1, wherein the selected pixel area is a 3×3 of pixel area.

8. The image processing method of claim 1, wherein the chromatic aberration value of the pixels in the selected pixel area is a sum of the chromatic aberration values between each two adjacent pixels in the selected pixel area and the chromatic aberration value between pixels located along a periphery of the selected pixel area and the pixels' adjacent pixels on the periphery of the selected pixel area is a sum of the chromatic aberration values between each pixel located along the periphery of the selected pixel area and the corresponding pixels' adjacent pixels on the periphery of the selected pixel area.

9. The image processing method of claim 8, wherein the predetermined rule is that if a difference between the sum of the chromatic aberration values of each two adjacent pixels in the selected pixel area and the sum of the chromatic aberration values between each pixel located along the periphery of the selected pixel area and the corresponding pixels' adjacent pixels on the periphery of the selected pixel area is greater than the chromatic aberration threshold value, the selected pixel area is considered as an area where the noise points stays and the image denoise process is executed in the selected pixel area.

10. The image processing method of claim 1, wherein if the difference between the sum of the chromatic aberration values of each two adjacent pixels in the selected pixel area and the sum of the chromatic aberration values between each pixel located along the periphery of the selected pixel area and the corresponding pixels' adjacent pixels on the periphery of the selected pixel area and the chromatic aberration threshold value do not meet the predetermined rule, the other pixel area is selected to test.

\* \* \* \* \*